(12) United States Patent
Lim

(10) Patent No.: US 10,013,590 B2
(45) Date of Patent: Jul. 3, 2018

(54) MOBILE RFID READER

(71) Applicant: HANMI IT CO., LTD., Seoul (KR)

(72) Inventor: Jong Hoon Lim, Seoul (KR)

(73) Assignee: HANMI IT CO., LTD., Seoul (KR)

( * ) Notice: Subject to any disclaimer, the term of this patent is extended or adjusted under 35 U.S.C. 154(b) by 0 days.

(21) Appl. No.: 15/113,049

(22) PCT Filed: Jan. 21, 2015

(86) PCT No.: PCT/KR2015/000622
§ 371 (c)(1),
(2) Date: Jul. 21, 2016

(87) PCT Pub. No.: WO2015/111910
PCT Pub. Date: Jul. 30, 2015

(65) Prior Publication Data
US 2017/0004336 A1    Jan. 5, 2017

(30) Foreign Application Priority Data

Jan. 21, 2014  (KR) .................. 10-2014-0007452
Jan. 21, 2014  (KR) .................. 10-2014-0007464

(51) Int. Cl.
*G06K 19/00*  (2006.01)
*G06K 7/10*   (2006.01)
*G06K 19/077* (2006.01)

(52) U.S. Cl.
CPC ..... *G06K 7/10386* (2013.01); *G06K 7/10009* (2013.01); *G06K 7/10138* (2013.01); *G06K 19/07758* (2013.01); *G06K 19/07775* (2013.01)

(58) Field of Classification Search
USPC .......... 235/435, 439, 451, 487, 492; 340/10, 340/572
See application file for complete search history.

(56) References Cited

U.S. PATENT DOCUMENTS

2004/0056760 A1*  3/2004  Fukuoka ............ G06K 7/10881
                                                340/10.3
2013/0293731 A1* 11/2013  Kim ...................... H04N 5/2251
                                                348/211.2
2013/0311314 A1* 11/2013  Fernando ................. G06K 7/01
                                                705/17

* cited by examiner

*Primary Examiner* — Matthew Mikels
(74) *Attorney, Agent, or Firm* — KORUS Patent, LLC; Seong Il Jeong

(57) ABSTRACT

Disclosed herein is a mobile Radio Frequency Identification (RFID) reader: including a plate panel for recognition of RFID tag information configured to include an antenna and a recognition surface; a grip configured such that the central axis of thereof is included in a plane to which the plate panel for the recognition of RFID tag information belongs and the grip is substantially parallel to the height direction of the plate panel for recognition of RFID tag information and is spaced apart from the plate panel for recognition of RFID tag information; and a coupling portion configured such that the coupling portion is substantially parallel to the horizontal direction of the recognition surface of the plate panel for recognition of RFID tag information and both ends of the coupling portion are coupled to the plate panel for recognition of RFID tag information and the grip, respectively.

11 Claims, 9 Drawing Sheets

MOBILE RFID READER

TECHNICAL FIELD

The present invention relates to a mobile Radio Frequency Identification (RFID) reader, and more particularly to a mobile RFID reader which can be held by the hand and manipulated during movement in real time, which can be manipulated during rest or movement without being released, and which enables a wide antenna to be disposed therein, thereby efficiently improving signal recognition rate.

BACKGROUND ART

Information recognition technology using Radio Frequency Identification (RFID) requires an RFID tag and an RFID reader.

An RFID tag includes an RFID chip. Required information is recorded on the RFID chip, and the RFID tag transmits the information to an RFID reader via an antenna. Generally, the information stored on the RFID chip is used to identify an object attached to the RFID tag. An RFID system is different from a barcode system in that the RFID system uses radio waves instead of light.

Information recognition technology using RFID has the advantage of being capable of reading a tag over a long distance, as well as operating over a short distance like a barcode reader, and the advantage of being capable of receiving information through an obstacle.

At the UHF band (433 MHz, and 860 to 960 MHz) frequency, the recognition distance of a mobile RFID reader ranges from about 5 to about 10 m, and the communication-enabled distance thereof is about 2 m. It is known that the distance over which recognition can be performed via the mobile RFID reader is a maximum of 2 m in an actual application environment due to RF wave interference attributable to a surrounding environment, etc. Stable signal strength and the ensuring of a sufficient recognition distance are directly related to information recognition rate.

A non-contact type recognition apparatus using RFID essentially requires technology for the ensuring of a sufficient recognition distance and the improvement of recognition rate. For this purpose, a method of increasing the output of a mobile RFID reader or extending the area of an antenna has been considered.

However, there is a limitation to an increase in output, and it cannot be expected that the recognition distance is extended or the recognition rate is improved even when the output is increased. An alternative to this is the extension of the area of an antenna. However, in this case, it is difficult to ensure the large area of the antenna because the portability of the mobile RFID reader must be taken into account.

The information recognition technology using RFID includes known technologies related to the improvement of recognition rate. For example, Korean Patent Application No. 10-2012-0023986 (Patent Document 1) discloses a proposal in which the circuit pattern of an RFID tag is designed to maximally reduce leakage current and to supply sufficient current to an antenna, thereby improving the recognition rate of a tag system. Korean Patent Application No. 10-2010-0051210 (Patent Document 2) discloses a proposal in which precise recognition rate and high-speed tag recognition are implemented using an antenna whose angle is varied according to a location distance value between an RFID tag and a reader. These technologies are all presented to acquire the effect of improving signal recognition rate by increasing the area of the antenna or improving the design of antenna arrangement in common.

It may be expected that the appropriate design of the RFID tag circuit pattern, such as that of Patent Document 1, brings about an improvement in the recognition rate of a tag system as a result. However, in mobile RFID information recognition technology, the performance of the RFID reader that is moving is more important to the determination of recognition rate than the performance of the RFID tag. Accordingly, the design does not influence the ensuring of a stable recognition rate in a non-contact type mobile RFID recognition apparatus.

Although Patent Document 2 discloses a technology of increasing recognition rate by varying the angle of the antenna formed in the body of the RFID reader, the apparatus of this technology cannot be easily moved in the state of being held by the hand, the manipulation of the apparatus is inconvenient, and the movement and carrying of the apparatus is inconvenient. Furthermore, the apparatus is complex in terms of structure, and has low manufacturing efficiency. Additionally, this technology does not present the combination of a terminal device that outputs recognized information, and thus the apparatus has a structure that is inconvenient for real-time use during movement.

Meanwhile, examples of the structures of RFID readers that have simplified structures and are easy to move and carry are disclosed in Korean Patent Application Publication No. 10-2008-0056327 (Patent Document 3) entitled "Portable Barcode Reader" and Korean Patent Application Publication Nos. 10-2008-0056328 and 10-2008-0056329 entitled "RFID Reader on which Mobile Terminal is Mountable." However, these technologies have a limitation to the ensuring of a stable signal recognition rate.

DISCLOSURE

Technical Problem

Accordingly, the present invention is intended to overcome the above-described problems of the conventional art, and an object of the present invention is to provide a mobile Radio Frequency Identification (RFID) reader that can ensure stable real-time recognition rate during movement and, simultaneously, is convenient to use.

Another object of the present invention is to provide a high-reliability mobile RFID reader which can be easily held by the hand and manipulated during movement in real time and which can be securely manipulated during rest or movement without being released.

Still another object of the present invention is to apply a large-area antenna capable of recognizing RFID information to a mobile RFID reader in an optimized and simplified state, thereby increasing recognition rate.

Still another object of the present invention is to provide a mobile RFID reader which can be held by the hand and used so that real-time use is enabled in a moving and resting state.

Still another object of the present invention is to economically manufacture a high-quality mobile RFID reader in which the configuration thereof is simplified, so that the mobile RFID reader has few failures, few errors and high durability.

Technical Solution

In order to accomplish the above objects, according to an aspect of the present invention, there is provided a mobile RFID reader including an RFID recognition part configured to recognize an RFID tag signal, the mobile RFID reader including: a flat plate panel for recognition of RFID tag information configured such that an antenna configured to recognize RFID tag information is disposed therein and a finite plane recognition surface having predetermined lengths in a horizontal direction, i.e., a lateral lengthwise direction, and in a height direction, i.e., a vertical lengthwise direction, respectively, is provided; a grip formed in a rod shape having a predetermined length so that the mobile RFID reader can be gripped by the hand, and configured such that the central axis of the grip in the lengthwise direction of the grip is included in a plane to which the plate panel for the recognition of RFID tag information belongs, the grip is substantially parallel to the height direction of the plate panel for recognition of RFID tag information, and the grip is disposed to be spaced apart from the plate panel for recognition of RFID tag information by a predetermined distance; and a coupling portion formed in a rod shape having a predetermined length, and configured such that the coupling portion is disposed to be substantially parallel to the horizontal direction of the recognition surface of the plate panel for recognition of RFID tag information, one end of the coupling portion is coupled to the plate panel for recognition of RFID tag information, and the other end of the coupling portion in the lengthwise direction of the coupling portion is coupled to the grip.

Advantageous Effects

The present invention can provide a mobile RFID reader that can ensure stable real-time recognition rate during movement and, simultaneously, is convenient to use.

Furthermore, the present invention can provide a high-reliability mobile RFID reader that can be easily held by the hand and manipulated during movement in real time and can be securely manipulated during rest or movement without being released.

Furthermore, the present invention is configured to be able to mount a large-area antenna capable of recognizing RFID information in a mobile RFID reader in an optimized state, thereby increasing RFID tag information recognition rate.

Furthermore, the present invention can provide a mobile RFID reader that can be securely held by the hand and used so that real-time use is enabled in a movement and resting state.

Furthermore, the present invention is configured to be able to economically manufacture a high-quality mobile RFID reader in which the configuration thereof is simplified, so that the mobile RFID reader has few failures, few errors and high durability.

The effects that can be achieved in the present invention are not limited to the above-described effects, and other effects that have not been described will be clearly understood by those having ordinary knowledge in the art to which the present invention pertains from the following description.

MODE FOR INVENTION

Figure 1:
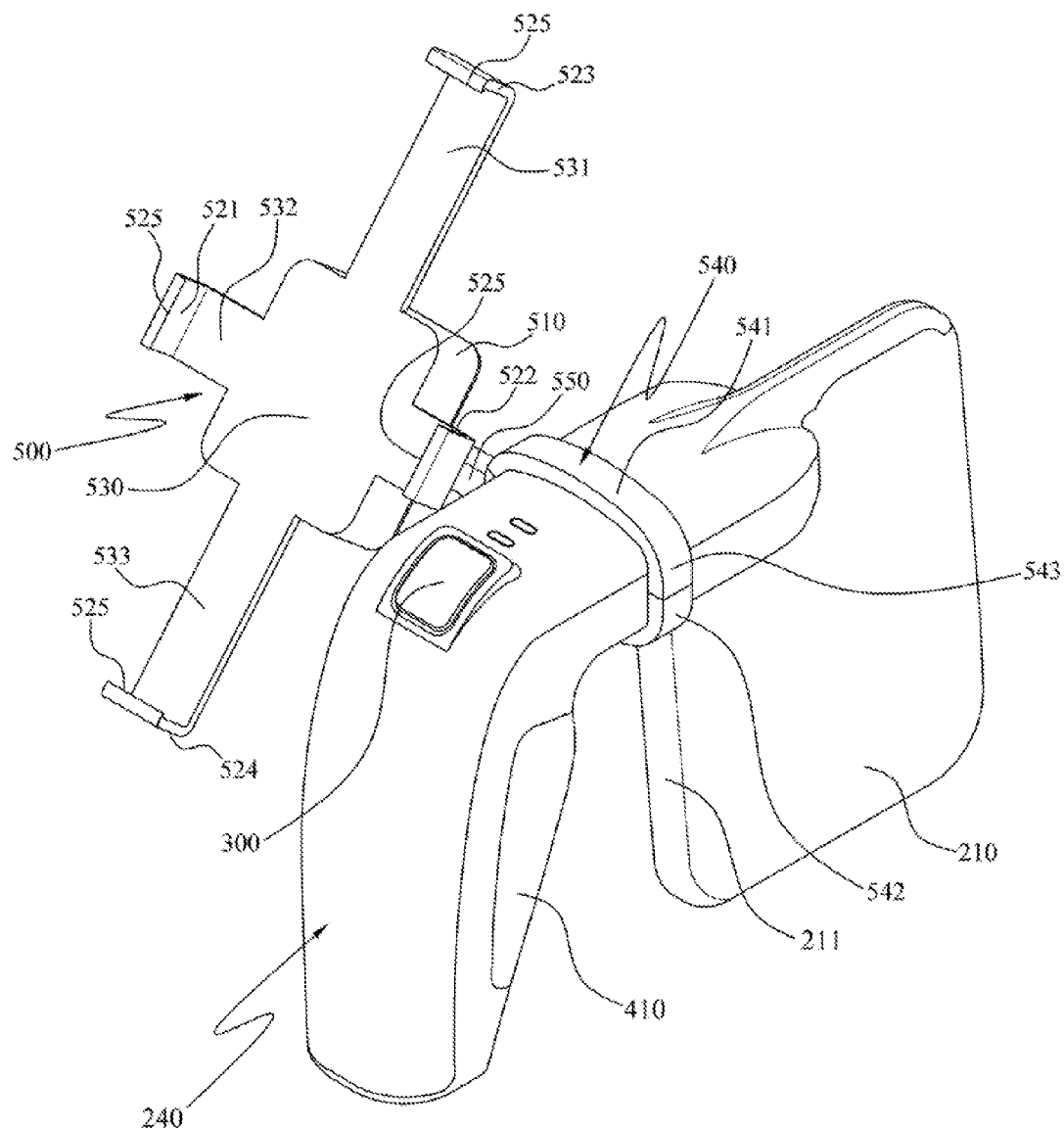
FIG. 1 is a perspective view of a mobile RFID reader according to an embodiment of the present invention.

Embodiments of the present invention will be described below with reference to the accompanying drawings in order to enable those having ordinary knowledge in the art to which the present invention pertains to easily practice the present invention. However, the present invention may be implemented in different forms, and is not limited to embodiments described herein. Furthermore, in order to clearly illustrate the present invention in the drawings, portions unrelated to the following description will be omitted. Throughout the specification, similar reference symbols will be assigned to similar portions.

Throughout the specification, when any portion is described as being "connected" to another portion, this includes both the case where the any portion is "directly connected" to the other portion and the case where the any portion is "electrically connected" to the other portion through a third portion. Furthermore, when any portion is described as including any component, this does not mean that another component is excluded but means that the any portion may include another component unless otherwise specified.

The present invention will be described in detail with reference to the accompanying diagrams.

Prior to the following description, the meanings of terms that will be used below are defined first.

In the present invention, the term "recognition surface" refers to a finite plane that forms a plate panel for the recognition of RFID tag information, i.e., a component of a mobile RFID reader and has a predetermined area.

Furthermore, based on the recognition surface of the plate panel for the recognition of RFID tag information, a lateral lengthwise direction is referred to as a "horizontal direction," the vertical lengthwise direction of the recognition surface is referred to as a "height direction," and the lengthwise direction of the thickness of the plate panel for the recognition of RFID tag information is referred to as a "widthwise direction."

That is, the horizontal direction of the recognition surface is a lengthwise direction substantially parallel to a ground surface, and the height direction is the lengthwise direction of the recognition surface substantially perpendicular to the ground surface.

For example, the recognition surface may have a horizontal length and a height length that are the same as each other, or may have a horizontal length and a height length that are different from each other.

Embodiments of the present invention are described in detail with reference to the accompanying diagrams as follows.

A mobile RFID reader according to an embodiment of the present invention includes a mobile RFID reader including a grip part configured to be held in his or her hand, an RFID recognition part configured to recognize an RFID tag (not shown) signal, and a user terminal pocket part configured to accommodate a user terminal, as shown in FIGS. 1 to 9.

In this case, a user terminal pocket 500 may be selectively coupled to a mobile RFID reader 200a.

Referring to FIG. 1, the mobile RFID reader 200a may include a flat plate panel 210 for the recognition of RFID tag information, in which an antenna configured to recognize RFID tag information is disposed therein and a finite plane recognition surface having predetermined lengths in a horizontal direction, i.e., a lateral lengthwise direction, and in a height direction, i.e., a vertical lengthwise direction, is provided thereon.

Furthermore, the mobile RFID reader 200a may include a grip 240. The grip 240 may be formed in a rod shape having a predetermined length so that the mobile RFID reader 200a can be held by the hand, the central axis of the grip 240 in the lengthwise direction of the grip may be included in a plane to which the plate panel 210 for the recognition of RFID tag information belongs, the grip 240 may be substantially parallel to the height direction of the plate panel 210 for the recognition of RFID tag information, and the grip 240 may be disposed to be spaced apart from the plate panel 210 for the recognition of RFID tag information by a predetermined distance.

Furthermore, the mobile RFID reader 200a may include a coupling portion 260. The coupling portion 260 may be formed in a rod shape having a predetermined length, coupling portion 260 may be disposed to be substantially parallel to the horizontal direction of the recognition surface of the plate panel 210 for the recognition of RFID tag information, one end of the coupling portion 260 may be coupled to the plate panel 210 for the recognition of RFID tag information, and the other end of the coupling portion 260 in the lengthwise direction of the coupling portion 260 may be coupled to the grip 240.

Meanwhile, the mobile RFID reader 200a may include the user terminal pocket 500 that is selectively and detachably mounted on the coupling portion 260 and that accommodates the user terminal 600.

Components that constitute the mobile RFID reader are described in detail below.

First, the flat plate panel 210 for the recognition of RFID tag information may recognize RFID tag information.

For this purpose, the antenna (not shown) configured to recognize a signal through communication with an RFID tag (not shown) may be installed in a predetermined pattern through a part or all of the plate panel 210 for the recognition of RFID tag information.

In this case, the antenna may be installed in a form that fills the area of the recognition surface of the plate panel 210 for the recognition of RFID tag information, or may be attached to the recognition surface of the plate panel 210 for the recognition of RFID tag information. An area where the antenna can be maximally installed may be proportional to the area of the recognition surface of the plate panel 210 for the recognition of RFID tag information.

Figure 2:
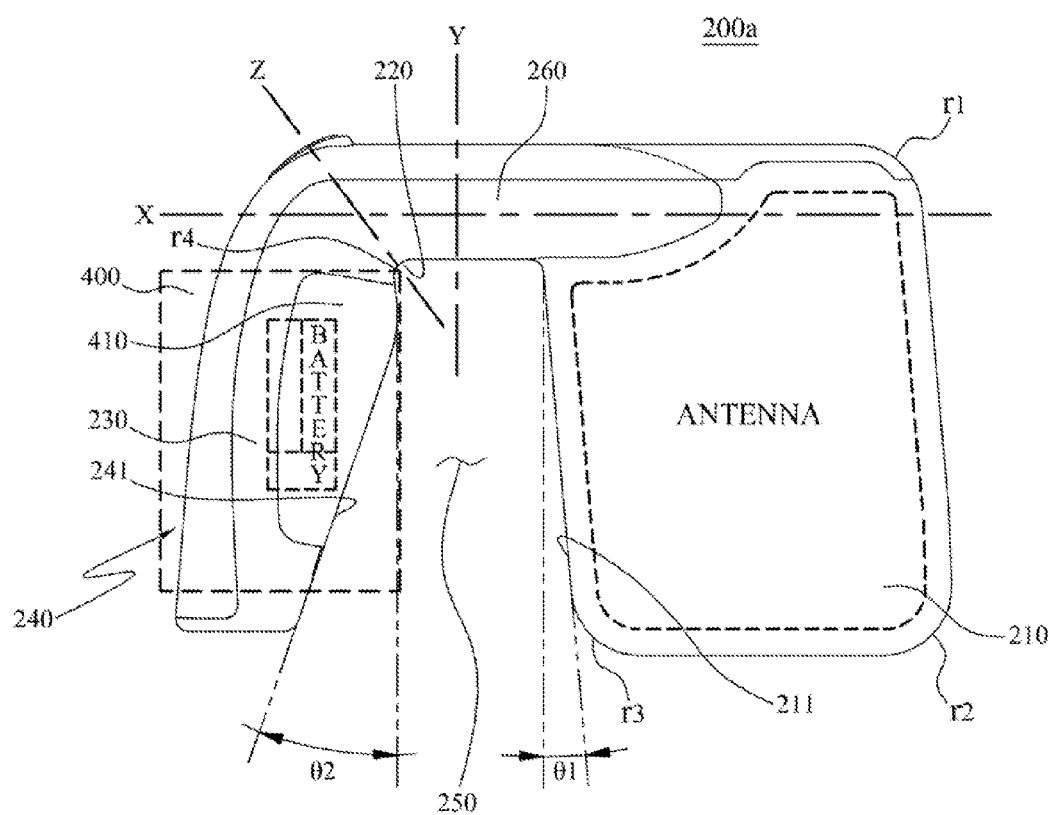
FIG. 2 is a front view of the mobile RFID reader according to the embodiment of the present invention.

Referring to FIG. 2, the antenna may be installed in the plane of the plate panel 210 for the recognition of RFID tag information. In some embodiments, there may be formed an inclined surface 211, which is an outer circumferential surface of the plate panel 210 for the recognition of RFID tag information that is formed in such a manner that an axis in the height direction of the recognition surface of the plate panel 210 for the recognition of RFID tag information is inclined at an angle of θ1 with respect to an axis perpendicular to the lengthwise direction of the coupling portion 260. The corner portions of the plate panel 210 for the recognition of RFID tag information may be formed to have round surfaces r1, r2 and r3 having predetermined curvatures.

The round surfaces r1, r2 and r3 of the corner portions function to prevent the hand from being damaged in connection with the frequent contact of the hand, and also function to reduce the risk of being damaged and the risk of causing damage to the human body in connection with holding and handling using the hand.

Furthermore, the grip 240 may be formed in a rod shape having a predetermined length so that the mobile RFID reader can be held by the hand, the central axis of the grip 240 in the lengthwise direction of the grip 240 may be included in a plane to which the plate panel 210 for the recognition of RFID tag information belongs, and the grip 240 may be disposed to be spaced apart from the plate panel 210 for the recognition of RFID tag information by a predetermined distance.

Furthermore, in the state where a user holds the grip 240, a finger is fitted into the depression 220 of the grip 240, so that a firm grip state can be maintained and a slip can be prevented when the grip 240 is held in his or her hand.

In this case, it is preferred that the depression 220 is formed in an axial (z) direction in a diagonal direction between the lengthwise direction of the grip 240 and the lengthwise direction of the coupling portion 260, i.e., along the inner circumferential surface of a curved surface that is formed when one end of the grip 240 is coupled to the coupling portion 260. The depression 20 is formed to have a round surface r4 having a predetermined curvature, and thus functions to hold a finger in order to prevent a slip when the finger makes a contact or functions to allow a finger to be securely removed when the grip 240 is released and the finger is removed.

Furthermore, the grip 240 may include a battery accommodation portion 400 configured to accommodate a battery and a battery cover 410 disposed along the inner circumferential surface of the grip 240 to enable the battery to be mounted and removed.

Referring to FIG. 2, there is shown an embodiment of the mobile RFID reader 200a in which a battery is mounted in the grip 240 and the battery cover 410 is mounted.

As described above, the battery is accommodated in the grip 240, and thus the weight of the battery is added to the weight of the grip 240, with the result that the grip 240 is heavier than the plate panel 210 for the recognition of RFID tag information, thereby facilitating the grip and use of the mobile RFID reader 200a, as will be described later.

Furthermore, the grip 240 is formed to have a predetermined thickness t1, and thus predetermined gripping force can be continuously maintained when a user holds the grip 240 in his or her hand.

That is, the grip 240 is easily removed from the hand when the thickness t1 of the grip 240 is excessively large, and the grip 240 easily slips out of the hand when the thickness t1 of the grip 240 is excessively small. Accordingly, preferably, the thickness t1 of the grip 240 may be determined based on the thickness of the grip of pistols classified as firearms, thereby enabling sufficient gripping force to be maintained.

Figure 3:
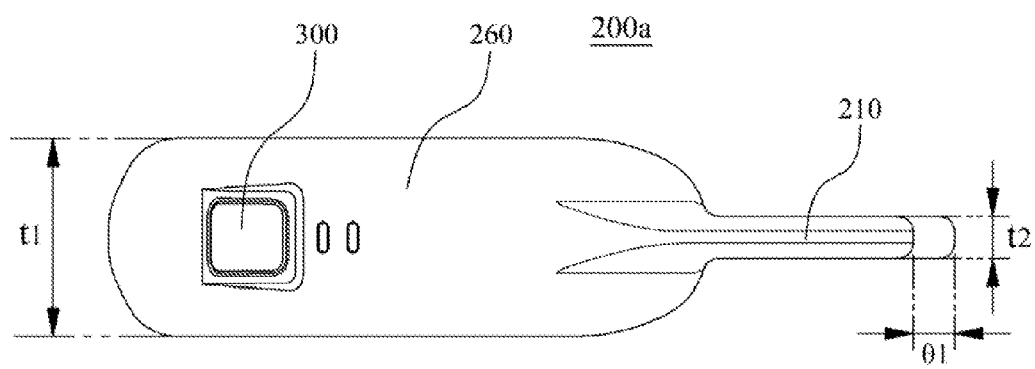
FIG. 3 is a plan view of the mobile RFID reader according to the embodiment of the present invention.

FIG. 3 is a plan view showing the mobile RFID reader 200a according to the embodiment of the present invention. Referring to this drawing, when the thicknesses t1 of the grip 240 and coupling portion 260 of the mobile RFID reader 200a are the same as each other, the shape of the mobile RFID reader 200a can be simplified when the mobile RFID reader 200a is manufactured in an integrated form, and thus the mobile RFID reader 200a can be formed through single injection molding, thereby improving fabrication and manufacturing efficiencies. Furthermore, this may be effective in moving the center of gravity of the mobile RFID reader 200a.

However, the thicknesses of the grip 240 and the coupling portion 260 are not necessarily the same as each other. In some embodiments, it is preferred that in connection with the thickness t2 of the plate panel 210 for the recognition of RFID tag information, at least the thickness t2 of the plate 210 for the recognition of RFID tag information is larger than the thickness t1 of the coupling portion 260.

When the thickness t1 of the grip 240 and the coupling portion 260 is larger than the thickness t2 of the plate panel 210 for the recognition of RFID tag information, the center of gravity of the mobile RFID reader 200a is present in the grip 240, and thus gripping force used to hold the grip 240 increases and supporting force becomes better.

Meanwhile, the grip 240 may be formed to have an inclined surface 241, which is the inner circumferential surface of the grip 240 that is formed in such a manner that an axis in the lengthwise direction of the grip 240 is inclined at an angle of θ2 with respect to an axis y perpendicular to the lengthwise direction of the coupling portion 260.

This shape may naturally guide the hand through its operation when the grip 240 is held in or released from his or her hand through an insertion space 250, like the inclined surface 211, which is the outer circumferential surface of the plate panel 210 for the recognition of RFID tag information that is formed in such a manner that the axis in the height direction of the recognition surface of the plate panel 210 for the recognition of RFID tag information is inclined at the angle of θ1 with respect to the axis perpendicular to the lengthwise direction of the coupling portion 260.

Furthermore, the mobile RFID reader includes the coupling portion 260 configured such that the plate panel 210 for the recognition of RFID tag information is coupled to one end of the coupling portion 260 and the grip 240 is coupled to the other end of the coupling portion 260 so that the plate 210 for the recognition of RFID tag information and the grip 240 are spaced apart from each other by a predetermined interval, as shown in FIG. 2.

That is, the coupling portion 260 is a portion that couples the plate 210 for the recognition of RFID tag information and the grip 240 to each other so that a predetermined interval can be maintained therebetween. One end of the coupling portion 260 is coupled to the upper end of the plate panel 210 for the recognition of RFID tag information in the height direction of the plate panel 210 and the other end of the coupling portion 260 is coupled to the upper end of the grip 240 in the lengthwise direction of the grip 240 to be substantially perpendicular to one end of the grip 240, thereby forming the shape of a pistol.

In this case, it is preferred that a corner portion where the shapes of the grip 240 and the coupling portion 260 are combined with each other is formed in the shape of a round surface having a predetermined curvature without a sharp corner. A manipulation button 300 may be installed on the outer circumferential surface of the curved surface that is formed when the shapes of the grip 240 and the coupling portion 260 are combined with each other, and thus the manipulation button 300 may be placed at a location where the manipulation button 300 can be immediately manipulated by moving the thumb in the state where the user holds the grip 240 in his or her hand, with the result that the manipulation button 300 can be conveniently manipulated.

Furthermore, the coupling portion 260 may forms the insertion space 250 that is open on the bottom thereof so that the hand or the fingers can be inserted between the plate panel 210 for the recognition of RFID tag information and the grip 240. The user may use the mobile RFID reader in the state of holding the mobile RFID reader by the hand after inserting the fingers and the hand into the insertion space 250.

As described above, in the light of the characteristic of use of the mobile RFID reader in which the mobile RFID reader recognizes tag information in real time while the user is moving in the state of gripping the mobile RFID reader by the hand after inserting the fingers and the hand into the insertion space 250 into which the fingers or the hand can be inserted, the inclined surfaces 211 and 241 inclined at predetermined angles may be formed on the plate panel 210 for the recognition of RFID tag information and the grip 240, respectively, as described above.

The wide insertion space 250 is ensured by the inclined surfaces 211 and 241, and thus the user can easily grip the mobile RFID reader.

Figure 4:
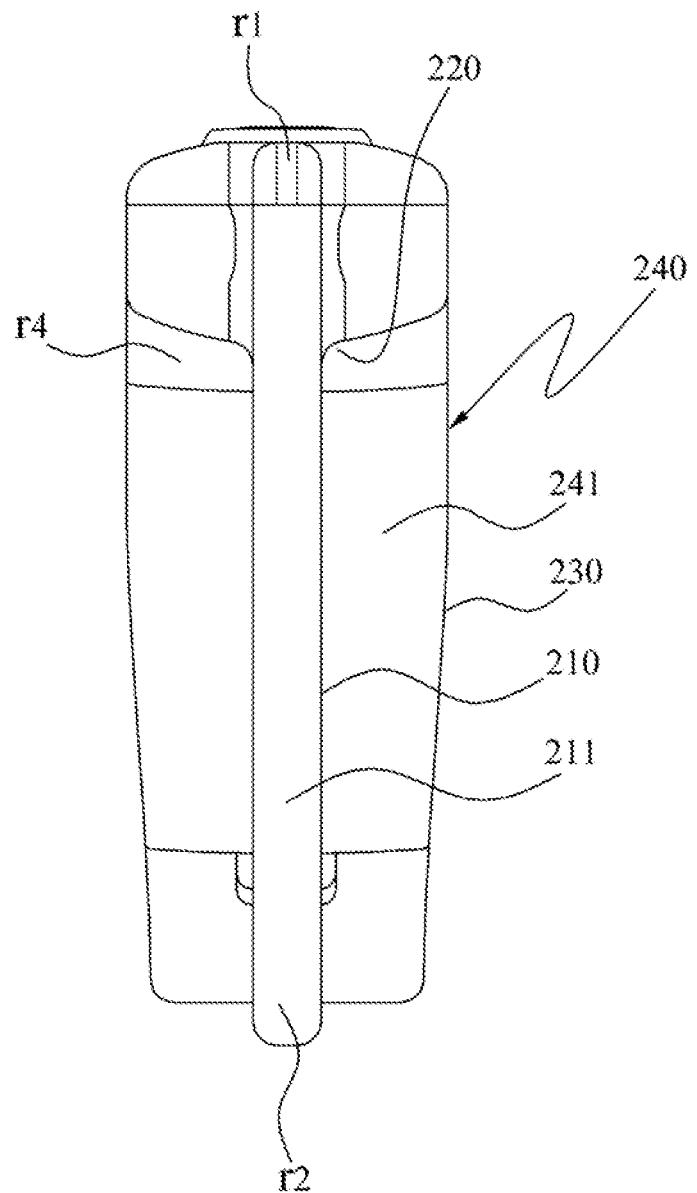
FIG. 4 is a one side view of the mobile RFID reader according to the embodiment of the present invention.

Meanwhile, the mobile RFID reader 200a according to the embodiment of the present invention may be manufactured as a single injection-molded product in which a portion of the grip 240 is integrated with one end corner portion of the plate panel 210 for the recognition of RFID tag information, i.e., an RFID recognition portion, as shown in FIGS. 2 to 4. Electric parts constituting parts of the mobile RFID reader may be disposed in the grip 240 or in the plate panel 210 for the recognition of RFID tag information in a mounting manner.

Accordingly, the mobile RFID reader is simplified in terms of structure and, thus, can be easily manufactured and improve mass production and manufacturing efficiencies; and the large-area plate panel 210 for the recognition of RFID tag information is used and, thus, maximally ensures an area occupied by an antenna; thereby improving recognition rate.

Meanwhile, in some embodiments, the mobile RFID reader 200a may include the user terminal pocket 500 configured to be detachably mounted on the coupling portion 260 and accommodate the user terminal 600.

Figure 5:
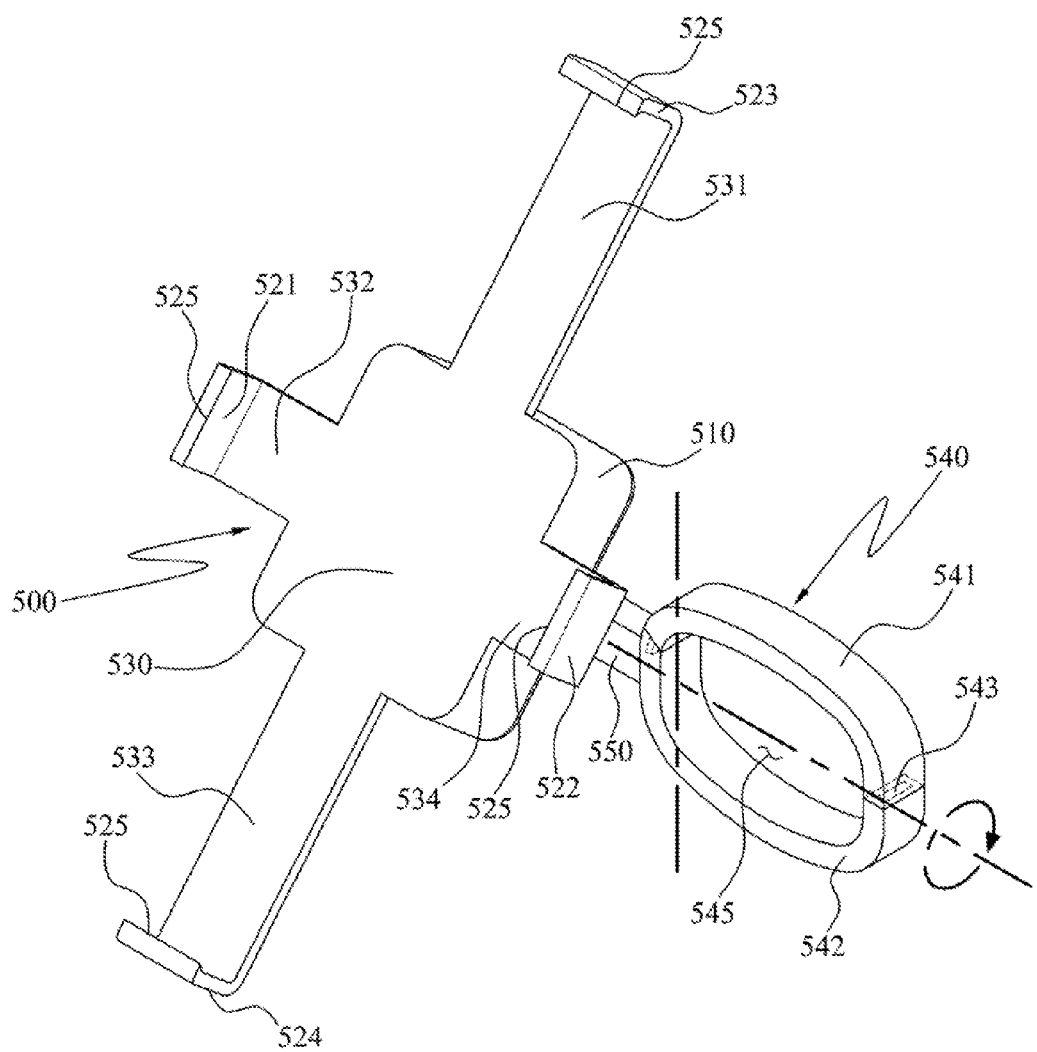
FIG. 5 is a detailed view showing the user terminal pocket of the mobile RFID reader according to the embodiment of the present invention.
Figure 6:
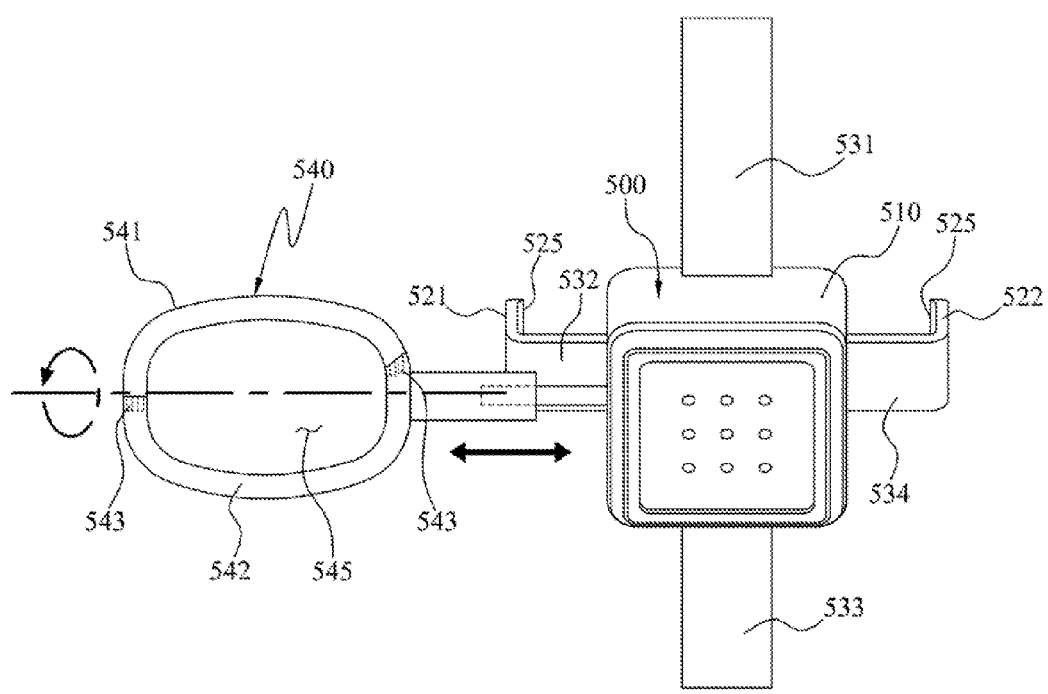
FIG. 6 is a diagram illustrating the operation of the user terminal pocket of the mobile RFID reader according to the embodiment of the present invention.
Figure 7:
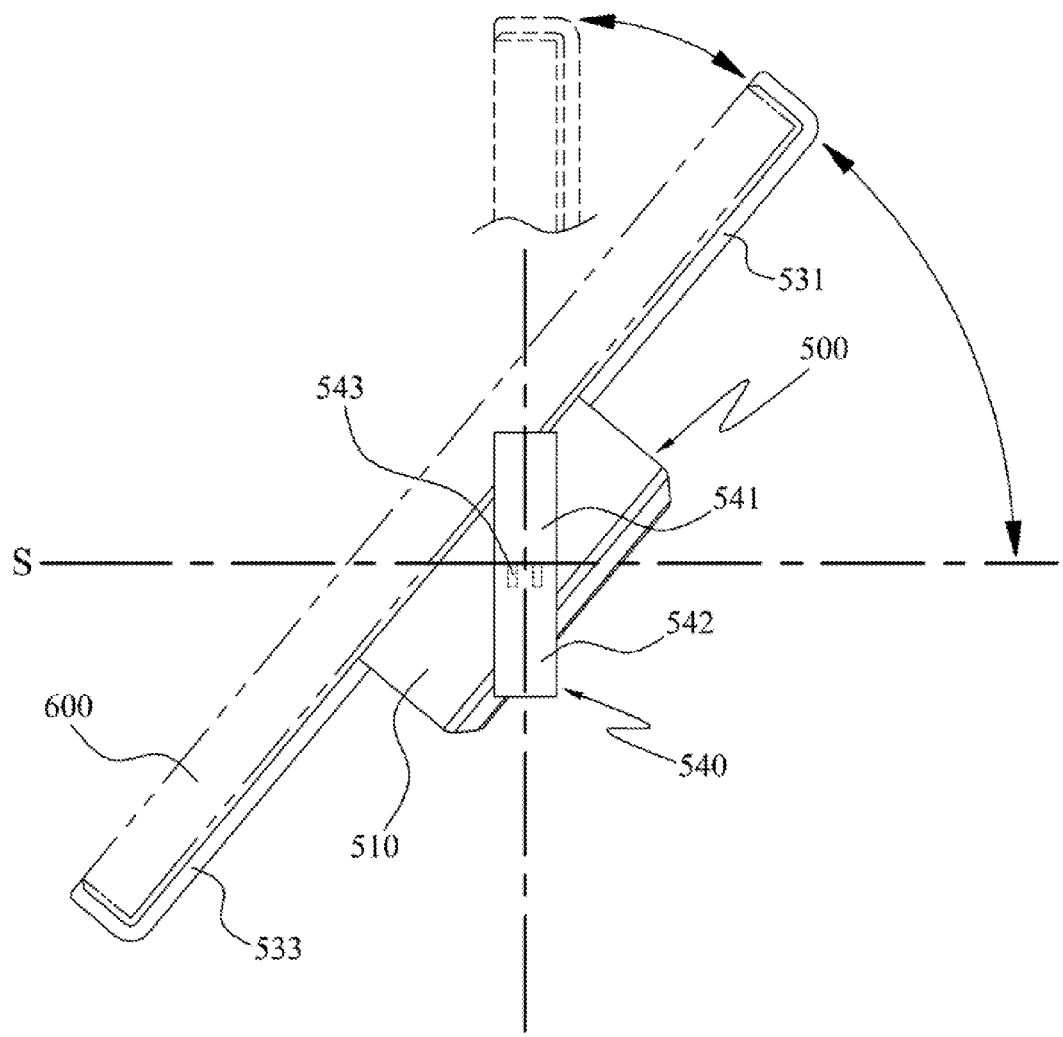
FIG. 7 is a diagram illustrating the adjustment of the angle of the user terminal pocket of the mobile RFID reader according to the embodiment of the present invention.

The user terminal pocket 500, such as those shown in FIGS. 5 to 7, may be mounted on the mobile RFID reader 200a, such as those shown in FIGS. 2 to 4.

Principle parts constituting the user terminal pocket 500 include a clamping holder 540 configured to be coupled to the coupling portion 260, a tray 530 configured to be coupled to the clamping holder 540 and accommodate the user terminal 600, and a tray body 510.

Furthermore, the tray 530 may include radial arms 531, 532, 533 and 534 configured to guide the user terminal 600 through its accommodation, and fingers 521, 522, 523 and 524 formed to extend from the radial arms, and bent in directions perpendicular to the lengthwise directions of the radial arms to thus come into tight contact with the user terminal 600, thereby preventing the user terminal 600 from being separated.

Furthermore, the tray body 510 may be configured to include the connection rod 550 configured to connect with the clamping holder 540.

In this case, the clamping holder 540 includes dampers 541 and 542 configured to be divided into two segments and to be disassembled and coupled to the coupling portion 260. The cut surfaces of the dampers 541 and 542 may include a coupling element 543 comprising a male coupling portion and a female coupling portion configured to be engaged with each other.

Furthermore, the tray body 510 is configured to be coupled to the clamping holder 540 via the connection rod 550 and to be rotated around the connection rod 550, and thus can be configured to enable the adjustment of an angle in the state in which the user terminal 600 is accommodated in the tray 530.

Referring to FIG. 7, the tray body 510 may be coupled to the clamping holder 540 so that the tray body 510 can be rotated using the clamping holder 540 as an axis S. Mechanisms that are commonly used to prohibit or suppress the rotation of the tray body 510 may be configured around the coupling portion to which the connection rod 550 is coupled, and then may suppress or control rotation. The detailed configuration thereof is omitted.

Furthermore, the fingers 521, 522, 523 and 524 may form separation prevention protrusions 525 configured to prevent the user terminal 600 from being separated, and thus may prevent the user terminal 600 seated on the tray 530 from being separated.

The arms 531, 532, 533 and 534 that extend radially from the tray 530 in the form of "+" can securely support the user terminal 600 on upper, lower, left and right sides, and do not come into contact with an overall surface of the user terminal 600, thereby being advantageous to a reduction in weight and reducing the amount of use of material.

Furthermore, although not shown in detail in the drawings, length-variable arms whose lengths can be adjusted to accommodate user terminals 600 having various sizes may be configured. For example, when each arm is configured by combining two segments so that the lengths of the arms can be adjusted, the lengths of the arms can be adjusted.

Referring to FIGS. 5 to 7, there is illustrated an example in which the clamping holder 540 includes the dampers 541 and 542 configured to be divided into two segments and to be disassembled and coupled to the coupling portion 260. In this case, when the cut surfaces of the clampers 541 and 542 include the coupling element 543 comprising a male coupling portion and a female coupling portion configured to be engaged with each other, the dampers 541 and 542 can be freely assembled and disassembled around the coupling portion 260, and are advantageous to the construction of a mobile RFID reader that can be freely carried, moved and stored.

Figure 8:
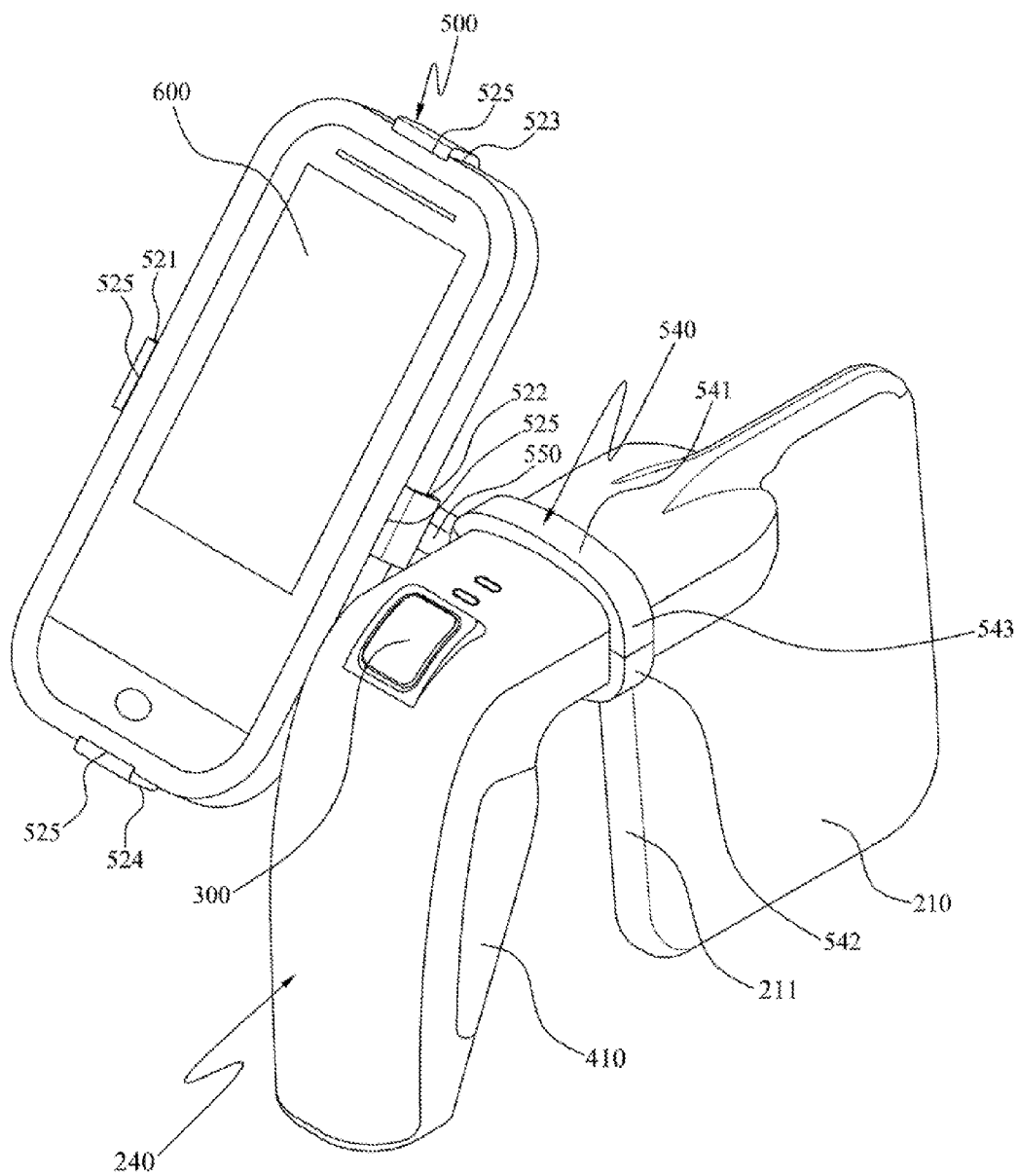
FIG. 8 is a diagram showing the state of use of the mobile RFID reader according to the embodiment of the present invention.

Furthermore, FIG. 8 shows an embodiment in which the user terminal pocket 500 is attached to the mobile RFID reader 200a. Referring to this drawing, the user terminal pocket 500 may be located on a left or right side perpendicular to the lengthwise direction of the coupling portion 260. For this purpose, the clamping holder 540 may be coupled to the coupling portion 260.

Figure 9:
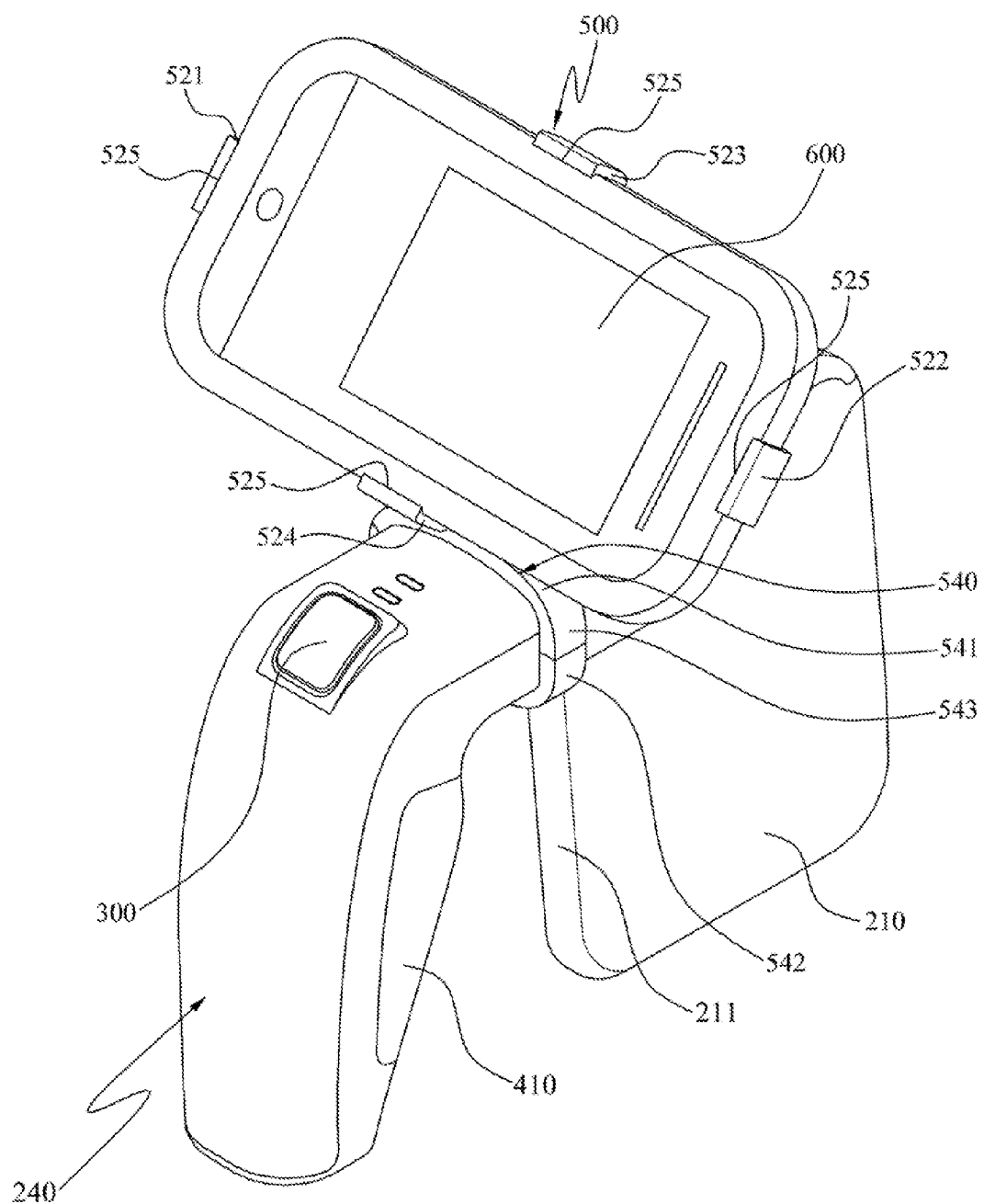
FIG. 9 is a diagram showing the state of use of a mobile RFID reader according to another embodiment of the present invention.

Alternatively, as shown in FIG. 9, the coupling location of the clamping holder 540 may be changed to an upper location of the coupling portion 260. In this case, it is sufficient if only the clamping holder 540 of the components is replaced with clampers 541 and 542 corresponding to the coupling portion 260.

As described above, according to the coupling location of the user terminal pocket 500 that is coupled at a location around the coupling portion 260, the viewing angle of the display surface of the user terminal 600 is variable, and thus the selectivity of an information recognition observation direction based on a use environment may be provided.

According to the present invention, the configuration of the mobile RFID reader is simplified in terms of its overall structure and, thus, can be easily manufactured and improve mass production and manufacturing efficiencies, the large-area plate panel for the recognition of RFID tag information is integrated with the grip and, thus, can improve recognition rate through the expansion of an area occupied by the antenna, and the mobile RFID reader can be always used in real time during movement and rest while being carried.

Furthermore, the present invention has the advantage of providing the portable mobile RFID reader having convenient manipulability, secure durability and high reliability.

The present invention is not limited to the embodiments, and may be modified or varied and then practiced within a range that does not depart from the gist of the present invention. Such modifications and variations are included in the technical spirit of the present invention.

The above description of the present invention is intended merely for the purpose of illustration. It will be apparent to those having ordinary knowledge in the art to which the present invention pertains that the present invention can be easily modified in other specific forms without changing the technical spirit and essential features of the present invention. Accordingly, the above-described embodiments are should be understood as being illustrative and not limitative in every aspect. For example, each component described as being in a single form may be practiced in a distributed form and, in the same manner, components described as being in a distributed form may be practiced in an integrated form.

The range of the present invention is defined by the following claims, rather than the detailed description. All variations and modifications derived from the meaning and scope of the claims and concepts equivalent thereto should be construed as being included in the range of the present invention.

INDUSTRIAL APPLICABILITY

The present invention relates to a mobile Radio Frequency Identification (RFID) reader, and more particularly to a mobile RFID reader that can be held by the hand and manipulated during movement in real time, can be manipulated during rest or movement without being released, and enables a wide antenna to be disposed therein, thereby efficiently improving signal recognition rate. Accordingly, the mobile RFID reader has industrial applicability.

The invention claimed is:

1. A mobile RFID reader including an RFID recognition part configured to recognize an RFID tag signal, the mobile RFID reader comprising:
   a flat plate panel for recognition of RFID tag information configured such that an antenna configured to recognize RFID tag information is disposed therein and a finite plane recognition surface having predetermined lengths in a horizontal direction, which is a lateral lengthwise direction, and in a height direction, which is a vertical lengthwise direction, respectively, is provided thereon;
   a grip formed in a rod shape having a predetermined length so that the mobile RFID reader can be gripped by a hand, and configured such that a central axis of the grip in a lengthwise direction of the grip is included in a plane to which the plate panel for the recognition of RFID tag information belongs, the grip is substantially parallel to a height direction of the plate panel for recognition of RFID tag information, and the grip is disposed to be spaced apart from the plate panel for recognition of RFID tag information by a predetermined distance;

a coupling portion formed in a rod shape having a predetermined length, and configured such that the coupling portion is disposed to be substantially parallel to a horizontal direction of the recognition surface of the plate panel for recognition of RFID tag information, one end of the coupling portion is coupled to the plate panel for recognition of RFID tag information, and a remaining end of the coupling portion in the lengthwise direction of the coupling portion is coupled to the grip; and a user terminal pocket detachably mounted on the coupling portion and configured to accommodate the user terminal, wherein the user terminal pocket comprises:

a clamping holder configured to be coupled to the coupling portion;

a tray configured to be coupled to the clamping holder and accommodate a user terminal; and a connection rod configured to connect the tray to the clamping holder, the connection rod being length-adjustable, wherein the clamping holder includes clampers configured to be divided into two segments and to be disassembled and coupled to the coupling portion, and cut surfaces of the clampers include a coupling element comprising a male coupling portion and a female coupling portion configured to be engaged with each other.

2. The mobile RFID reader of claim 1, wherein one end of the coupling portion in the lengthwise direction of the coupling portion is coupled to an upper end of the plate panel for recognition of RFID tag information in the height direction of the plate panel, and a remaining end of the coupling portion is coupled to an upper end of the grip in the lengthwise direction of the grip.

3. The mobile RFID reader of claim 1, wherein the plate panel for recognition of RFID tag information is configured such that the antenna configured to recognize RFID tag information is disposed through all or a part of the plate panel for recognition of RFID tag information in a plate shape.

4. The mobile RFID reader of claim 1, further comprising:

a manipulation button installed on an outer circumferential surface of a curved surface that is formed when shapes of the grip and the coupling portion are combined with each other; and a battery accommodation portion formed in the grip and configured to accommodate a battery, and a battery cover disposed along an inner circumferential surface of the grip and configured to enable the battery to be mounted and removed.

5. The mobile RFID reader of claim 1, wherein the plate panel for recognition of RFID tag information is configured such that corner portions of the plate panel for recognition of RFID tag information are formed to have round surfaces having predetermined curvatures.

6. The mobile RFID reader of claim 1, wherein a thickness of the grip is formed to be equal or equivalent to a thickness of the coupling portion.

7. The mobile RFID reader of claim 1, wherein a depression, internally depressed so that a finger can be inserted thereinto, is formed on an inner circumferential surface of a curved surface that is formed when a shape of one end of the grip is combined with a shape of the coupling portion, and the depression is formed to have a round surface having a predetermined curvature.

8. The mobile RFID reader of claim 1, wherein thicknesses of the grip and the coupling portion are formed to be greater than a thickness of the plate panel for recognition of RFID tag information so that a center of gravity of the mobile RFID reader is present in the grip.

9. The mobile RFID reader of claim 1, wherein the tray comprises:

a tray body;

radial arms configured to guide the user terminal through accommodation in the tray; and fingers formed to extend from the radial arms, and bent in directions perpendicular to lengthwise directions of the radial arms to thus come into tight contact with the user terminal, thereby preventing the user terminal from being separated.

10. The mobile RFID reader of claim 1, wherein the tray body is configured to be rotated around the connection rod.

11. The mobile RFID reader of claim 9, wherein the fingers are provided with separation prevention protrusions configured to prevent the user terminal from being separated.

* * * * *